US008369549B2

(12) United States Patent
Bartkowiak et al.

(10) Patent No.: US 8,369,549 B2
(45) Date of Patent: Feb. 5, 2013

(54) HEARING AID SYSTEM ADAPTED TO SELECTIVELY AMPLIFY AUDIO SIGNALS

(75) Inventors: John Gray Bartkowiak, Stromness (GB); David Matthew Landry, Austin, TX (US)

(73) Assignee: Audiotoniq, Inc., Austin, TX (US)

( * ) Notice: Subject to any disclaimer, the term of this patent is extended or adjusted under 35 U.S.C. 154(b) by 140 days.

(21) Appl. No.: 13/069,214

(22) Filed: Mar. 22, 2011

(65) Prior Publication Data

US 2011/0237295 A1 Sep. 29, 2011

Related U.S. Application Data

(60) Provisional application No. 61/316,544, filed on Mar. 23, 2010.

(51) Int. Cl.
*H04R 25/00* (2006.01)
*H04B 15/00* (2006.01)

(52) U.S. Cl. ......................... 381/312; 381/316; 704/221

(58) Field of Classification Search .................. 381/316, 381/312, 314, 60, 321, 320; 704/221
See application file for complete search history.

(56) References Cited

U.S. PATENT DOCUMENTS

| | | | | |
|---|---|---|---|---|
| 3,571,529 | A | 3/1971 | Gharib et al. | |
| 4,622,440 | A | 11/1986 | Slavin | |
| 6,912,289 | B2 * | 6/2005 | Vonlanthen et al. | 381/312 |
| 8,194,900 | B2 * | 6/2012 | Fischer et al. | 381/313 |
| 8,244,535 | B2 * | 8/2012 | Hubner et al. | 704/260 |
| 2009/0147977 | A1 * | 6/2009 | Lamm et al. | 381/315 |

* cited by examiner

*Primary Examiner* — Nitin Patel
*Assistant Examiner* — Padma Haliyur
(74) *Attorney, Agent, or Firm* — Lee & Hayes, PLLC

(57) ABSTRACT

A hearing aid includes a microphone to convert sounds into electrical signals and a memory to store a plurality of voice prints and a plurality of sound-shaping instructions. Each of the plurality of sound-shaping instructions is associated with one of the plurality of voice prints. The hearing aid further includes a processor coupled to the microphone and the memory. The processor is configured to compare at least one sample from the electrical signals to the plurality of voice prints to identify a voice print. The processor selects sound-shaping instructions associated with the voice print and applies the sound-shaping instructions to selectively shape a portion of the electrical signals corresponding to the voice print to produce a shaped signal. The hearing aid further includes a speaker coupled to the processor and configured to reproduce the shaped signal as an audible output.

20 Claims, 4 Drawing Sheets

HEARING AID SYSTEM ADAPTED TO SELECTIVELY AMPLIFY AUDIO SIGNALS

CROSS-REFERENCE TO RELATED APPLICATION(S)

This application is a non-provisional of and claims priority to U.S. Provisional Patent Application No. 61/316,544 filed on Mar. 23, 2010 and entitled "Hearing Aid System Adapted to Selectively Amplify Audio Signals," which is incorporated herein by reference in its entirety.

FIELD

This disclosure relates generally to hearing aids, and more particularly to hearing aids that are configurable to selectively amplify selected voice signals within a sound signal.

BACKGROUND

Hearing deficiencies can range from partial hearing impairment to complete hearing loss. Often, an individual's hearing ability varies across the range of audible sound frequencies, and many individuals have hearing impairment with respect to only select acoustic frequencies. For example, an individual's hearing loss may be greater at higher frequencies than at lower frequencies.

Hearing aids have been developed to compensate for hearing losses in individuals. Conventionally, hearing aids range from ear pieces configured to amplify sounds to hearing devices offering a couple of adjustable parameters, such as volume or tone, which the individual users can adjust.

Hearing aids typically apply hearing aid profiles that utilize a variety of parameters and response characteristics, including signal amplitude and gain characteristics, attenuation, and other factors. Unfortunately, many of the parameters associated with signal processing algorithms used in such hearing aids are designed to only bring the user's hearing back to a normal level as determined by a practitioner. A hearing health professional typically takes measurements using calibrated and specialized equipment to assess an individual's hearing capabilities in a variety of sound environments, and then adjusts the hearing aid based on the calibrated measurements to enhance the user's effective hearing to a level consistent with an accepted standard hearing level.

However, all the measurements and adjustments by the hearing health professional do not allow the user to calibrate the hearing aid for specific voice patterns of individual speakers. In some instances, the user may have particular difficulty hearing certain speakers, leaving the hearing aid user with a less than desirable hearing aid experience.

DETAILED DESCRIPTION OF ILLUSTRATIVE EMBODIMENTS

Embodiments of a system including a hearing aid and associated computing device are described below that cooperate to provide individual voice emphasis, sound shaping, and configuration update processes for enhancing a user's hearing experience within conversational environments. The hearing aid shapes sounds by applying a hearing aid profile configured to compensate for the user's particular hearing impairment. Further, the hearing aid selectively applies adjustments to enhance selected portions of the audio signal that are associated with a particular speaker. In some instances, the hearing aid amplifies or otherwise emphasizes a particular speaker's voice or particular frequencies corresponding to an individual's voice pattern, automatically enhancing a conversational experience of the user. In particular, the hearing aid can enhance sounds related to the particular voice pattern while reducing (filtering) background noise, and increasing acoustic clarity for the user. In an example, by selectively shaping selected frequency bands or voice patterns within the sounds received by the hearing aid, the hearing aid enhances or frames the speaker's voice while de-emphasizing other frequency bands to provide an enhanced hearing experience.

Figure 1:
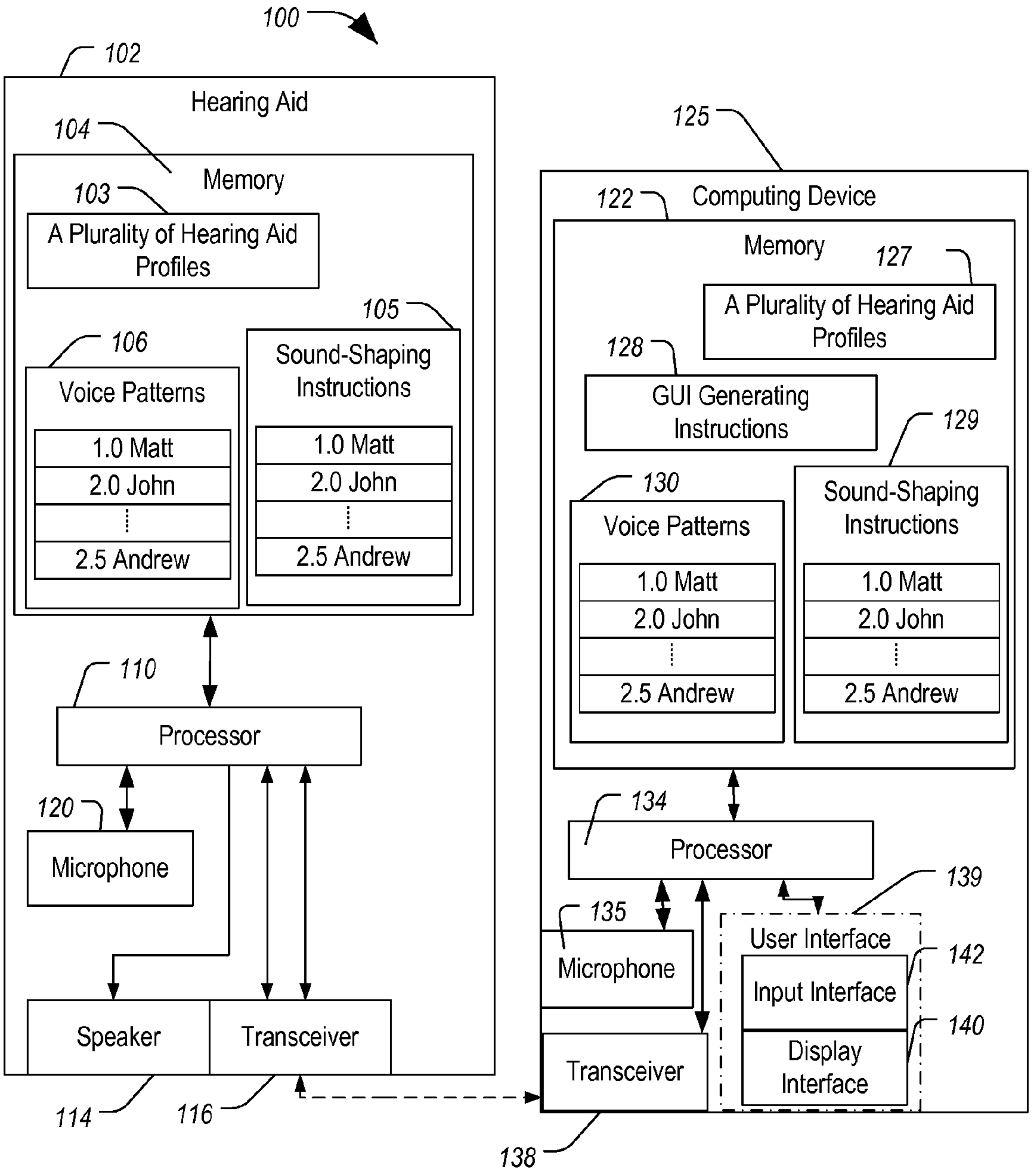
FIG. 1 is a block diagram of an embodiment of a hearing aid system adapted to selectively amplify audio signals or portions of audio signals.

FIG. 1 is a block diagram an embodiment of a hearing aid system 100 including a hearing aid 102 adapted to communicate with a computing device 125. Hearing aid 102 includes a transceiver 116 that is configured to communicate with computing device 125 through a communication channel. Transceiver 116 is a radio frequency transceiver configured to send and receive radio frequency signals, such as short range wireless signals, including Bluetooth® protocol signals, IEEE 802.11 family protocol signals, or other standard or proprietary wireless protocol signals. In some instances, the communication channel can be a Bluetooth® communication channel.

Hearing aid 102 also includes a processor 110 connected to a memory device 104. Memory device 104 stores a plurality of hearing aid profiles 103, a plurality of voice prints 106, and a plurality of sound shaping instructions 105. Additionally, hearing aid 102 includes a speaker 114 and a microphone 120, which are connected to processor 110.

Computing device 125 includes a processor 134 connected to a memory 122. Additionally, processor 134 is connected to a microphone 135, a transceiver 138, and a user interface 139. The user interface 139 includes an input interface 142 and a display interface 140. In some embodiments, a touch screen display may be used, in which case display interface 140 and input interface 142 are combined.

Memory 122 stores a plurality of hearing aid profiles 127, graphical user interface (GUI) generating instructions 128, a plurality of voice prints 130, and associated sound-shaping instructions 129. In an embodiment, computing device 125 is a personal digital assistant (PDA), a smart phone, a portable computer, or another device capable of executing instructions and processing data. One representative embodiment of computing device 125 includes the Apple iPhone®, which is commercially available from Apple, Inc. of Cupertino, Calif. Another representative embodiment of computing device 125 is the Blackberry® phone, available from Research In Motion Limited of Waterloo, Ontario. Other types of mobile telephone devices with instruction-processing and short range wireless capabilities configurable to communicate with hearing aid 102 can also be used.

Each voice print of the plurality of voice prints 106 and 130 contains sound characteristics associated with at least one individual. Each voice print represents an acoustic pattern that reflects both the anatomy of the person speaking (such as the size and shape of the throat and mouth of the speaker) and learned behavioral patterns (such as voice pitch, speaking style, and the like). A voice print represents a biometric identifier, which may be utilized by processor 110 or 134 to detect the speaker's voice within sounds. Each voice print 106 and 130 may be a statistically unique representation of a one or more characteristics of sounds derived from one or more audio samples of a particular speaker, which can be used to identify the particular speaker's voice within a sound signal that includes sounds from other audio sources.

As used herein, the term "sound characteristics" refers to acoustic parameters that can be used to distinguish between different sounds. In particular, the sound characteristics can be used to distinguish between voice patterns or to distinguish one speaker's voice from another's voice. In one instance, sound characteristics include a set, band, or range of frequencies, amplitudes (peak, minimum, and/or average), tones, octave levels, pitches, or any combination thereof. The sound characteristics may be associated with a particular speaker.

Hearing aid profiles 103 and 127 are collections of acoustic configuration settings for hearing aid 102 and are selectively used by processor 110 within hearing aid 102 to shape acoustic signals to correct (compensate) for the user's hearing loss. A practitioner or hearing health professional may create or configure each of the plurality of hearing aid profiles 103 and 127 based on the user's particular hearing characteristics to compensate for the user's hearing loss or otherwise shape the sound received by hearing aid 102. Alternatively, in some instances, one or more of the hearing aid profiles 103 and 127 may be created by the user in conjunction with software stored on computing device 125 based on an existing hearing aid profile. For example, each hearing aid profile 103 and 127 includes one or more values (or coefficients) for use with respect to a sound-shaping process executed by processor 110. Such values may include break frequencies, slopes, gains at various frequencies, a maximum power output, a dynamic range compression constant, a minimum power output, other values, or any combination thereof. Further, each hearing aid profile 103 and 127 can specify a particular sound-shaping equation for use with the particular values.

Further, multiple noise-filtering or sound-shaping instructions (equations) 105 and 129 are associated with a particular voice pattern and may be selected (activated) when the user is talking to the individual associated with the voice pattern (either based on a user selection or based on automated detection of a particular voice pattern). In a particular example, one or more of the sound-shaping instruction 105 is applied to shape or otherwise enhance the set, band, or range of frequencies associated with the voice pattern. The one or more sound-shaping instructions 105 may cause processor 110 to make specific adjustments that are not necessarily directed at correcting for the user's hearing loss. For example, the one or more sound-shaping instruction 105 could cause processor 110 to amplify sound signals within a specific frequency range while leaving sound signals at other frequencies unchanged. In another example, the sound-shaping instructions could cause processor 110 to frequency shift a portion of the sound signal (for example the portion of the sound signal related to a detected voice pattern) to another frequency or range of frequencies (such as a higher or lower frequency band) at which the user has better hearing. Such adjustments may enhance the user's listening experience without providing overall compensation or correction for the user's hearing impairment.

In operation, microphone 120 receives environmental noise or sounds, converts the sounds into electrical signals, and provides the electrical signals to processor 110. Processor 110 processes the electrical signals according to a currently selected hearing aid profile 103, and optionally according to one or more sound-shaping instructions 105, to produce a modulated (shaped) output signal and provides the shaped output signal to a speaker 114, which is configured to reproduce the modulated output signal as an audible sound at or within an ear canal of the user. The modulated (shaped) output signal is customized to compensate for the user's particular hearing deficiencies and optionally to provide additional sound-shaping for particular frequencies.

Processor 110 processes the electrical signals according to a selected one of the hearing aid profiles 103 associated with the user to produce a modulated (shaped) output signal that is customized to a user's particular hearing ability. The modulated output signal is provided to speaker 114, which reproduces the modulated output signal as an audio signal. In some instances, processor 110 may detect a particular one of the voice patterns 106 within the electrical signals from microphone 120 and may apply one or more sound-shaping instructions 105 to further modulate or shape the voice pattern and/or to filter or reduce other sounds.

In an example, when executed by processor 134, GUI generator instructions 128 cause the processor 134 to produce a graphical user interface (GUI) for display by the display interface 140, which may be a liquid crystal display (LCD) or another type of display or which may be an interface coupled to a display device. The user can interact with input interface 142 to select options presented by the GUI, such as an option to edit sound shaping instruction 129 associated with voice patterns 130, an option to record voice patterns, and an option to customize hearing aid profiles 127. By accessing input interface 142 to interact with the GUI, the user may modify any of the acoustic settings, including but not limited to frequencies, amplitudes, and gains.

In a particular example, once a voice pattern and associated sound-shaping instructions are created and saved in memory 122 on computing device 125 (as discussed below), the user may select an option from the GUI to edit the acoustic properties at any time via input interface 142 to vary the frequencies, alter the maximum gains, activate noise cancelation algorithms, or perform other setting adjustments.

In an example, the user can create a voice pattern for voice detection. During the creation process, the speaker's voice is recorded and a number of features are extracted by processor 135 to form the voice print. In some instances, a number of voice prints, templates or models are created for a given speaker, which can later be used to identify the voice print from a sound sample. In the verification phase, a speech sample or "utterance" is compared against a previously created voice print. Various technologies can be used to process and store voice prints including, but not limited to, frequency estimation, hidden Markov models, Gaussian mixture models, pattern matching algorithms, neural networks, matrix representation, Vector Quantization, decision trees, other techniques, or any combination thereof. It may also be possible to utilize cohort models or other models, which may sometimes be classified as "anti-speaker" models to generate the voice prints.

Using computing device 125, the user accesses input interface 142 to select a "Create Voice Print" option provided by the GUI to create, edit, and select voice prints and sound-shaping instructions. To create a voice print, the user would interact with the input interface 142 to select an option to trigger microphone 135 to record one or more sound samples of a speaker's voice. Processor 134 would then process the one or more sounds samples to produce a statistically unique representation of the user's voice, which can be referred to as a voice print, which represents one or more sound characteristics derived from the samples. In one example, processor 134 performs a transform operation, such as a Fast Fourier Transform, on the one or more sound samples, reducing the samples into a set, band, or range of frequencies associated with the particular voice. In another example, as mentioned above, processor 134 can process the sound samples using frequency estimation, hidden Markov models, Gaussian mixture models, pattern matching algorithms, neural networks, matrix representation, Vector Quantization, decision trees, other techniques, or any combination thereof Processor 134 may compare the processed samples to previously-produced processed samples to further refine the voice print associated with the individual's voice. For example, processor 134 could determine pitch, tone, and octave level parameters or other sound characteristics associated with the one or more sound samples. Processor 134 would then generate the voice print. Processor 134 may then further process the one or more sound samples to amplify, frequency-shift, or otherwise modulate the one or more sound samples based on the user's particular hearing impairment to determine a desired modification to enhance the user's hearing experience with respect to the particular speaker's voice. In an example, the desired modification may include amplification, frequency-shifts, or other adjustments. Once the desired modification is determined, processor 134 generates corresponding sound-shaping instructions for sounds associated with the voice print based on the various parameters and sound characteristics associated with the individual's voice as determined from the sound samples. Both the voice print and sound-shaping instruction would then be stored in memory 122 within the plurality of voice prints 130 and sound-shaping instructions 129.

In an alternative embodiment, hearing aid 102 may be utilized in conjunction with computing device 125 to generate the voice print and to produce the corresponding sound-shaping instructions. For example, microphone 120 could be used to capture samples of the speaker's voice and to provide the voice samples to computing device 125 through the communication channel via transceiver 116. In this example, the recording of the voice samples could be initiated by a user via computing device 125. For example, the user could select an option to capture voice samples by interacting with user interface 139. In response to the user selection, processor 134 generates an alert and transmits the alert to hearing aid 102 through the communication channel to trigger hearing aid 102 to record sound samples.

In response to receiving the alert, processor 110 controls microphone 120 to record one or more sound samples and to transmit them to computing device 125 through the communication channel. Processor 134 of computing device 125 then processes the sound samples to determine a voice print of the speaker and associated sound characteristics including, for example, unique characteristics of the speaker's voice that can be used to identify the speaker's voice within sounds that include multiple sounds from various audio sources, as discussed above. Processor 134 can generate a voice print and associated sound-shaping instructions based on the unique characteristics and stores the voice print and associated sound-shaping instructions in memory 122. In an example, the voice print can be used to identify a speaker's voice within an audio sample and the associated sound shaping instructions can be applied to the audio signal to selectively shape or adjust a portion of the audio signal that corresponds to the speaker's voice. In one instance, the portion can be a frequency band within which the speaker's voice is centered. In another instance, the portion includes selected audio components, such as tone, pitch or other audio components.

If the user wishes to activate particular sound shaping instructions, the user may select an option associated with the particular set of instructions from the plurality of sound shaping instructions 129 by accessing user interface 139. In one instance, in response to receiving the user selection, processor 134 provides the set of sound-shaping instructions to transceiver 138, which transmits them to hearing aid 102 through the communication channel.

Hearing aid 102 receives the selected sound shaping instructions, saves the instructions in memory 104, and applies the sound-shaping instructions to the electrical signals received from microphone 120 to shape the sounds. After processor 110 has shaped the sound signal to emphasize the frequencies associated with the voice print based on the sound shaping instructions, processor 110 provides the shaped signal to speaker 114 for output to the user. Additionally, processor 110 may apply a selected hearing aid profile 103 to the sound signal, before, during, or after applying the sound-shaping instructions 105 to produce the modulated output signal.

In another particular example, the user may be speaking to more than one individual. In such a case, the user may select multiple voice prints corresponding to sound-shaping instructions to apply to hearing aid 102. In this case, processor 110 applies multiple sound-shaping instructions to the electrical signals received from microphone 120 before transmitting to speaker 114, providing emphasis or enhancement for each of the selected voice prints. Further, processor 110 may apply a selected hearing aid profile 103 to the sound signal, before, during or after applying the sound-shaping instructions 105 are applied, to produce the modulated output signal.

While FIG. 1 represents a block diagram of hearing aid 102 many different types of hearing aids can be used to selectively amplify audio signals as described with respect to FIG. 1. For example, hearing aid 102 may be a behind-the-ear, in the ear, or implantable hearing aid design. A cross-sectional view of one possible behind-the-ear hearing aid design is described below with respect to FIG. 2.

Figure 2:
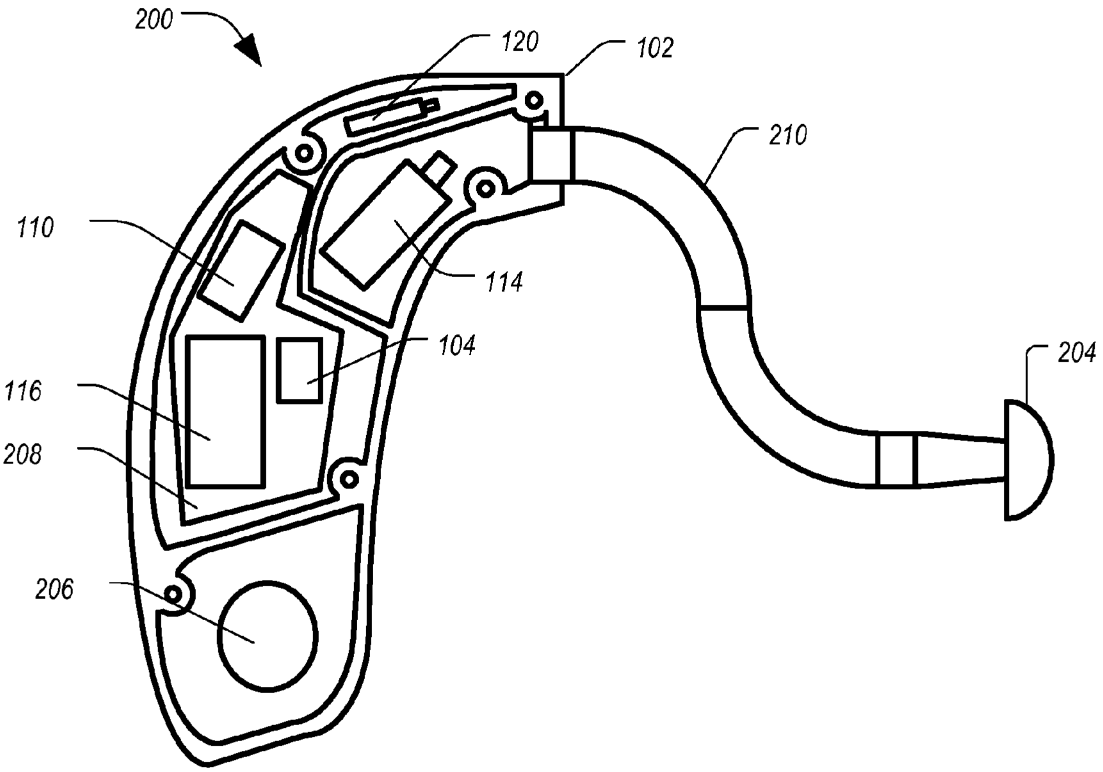
FIG. 2 is a cross sectional view of an embodiment of a hearing aid adapted to selectively amplify audio signals or portions of audio signals.

FIG. 2 is a cross-sectional view 200 of one possible representative embodiment of an external hearing aid 102 adapted to selectively amplify audio signals. Hearing aid 102 includes a microphone 120 to convert sounds into electrical signals. Microphone 120 is communicatively coupled to circuit board 208, which includes processor 110, transceiver 116, and memory 104. Further, hearing aid 102 includes a speaker 114 coupled to processor 110 and configured to communicate audio data through an ear canal tube to an ear piece 204, which may be positioned within the ear canal of a user. Further, hearing aid 102 includes a battery 206 to supply power to the other components.

During operation, microphone 120 converts sounds into electrical signals and provides the electrical signals to processor 110, which processes the electrical signals according to hearing aid configuration data associated with the user, such as a hearing aid profile and sound shaping instructions, to produce a modified output signal that is customized to a user's particular hearing ability. The modified output signal is provided to speaker 114, which reproduces the modified output signal as an audio signal and provides the audio signal through an ear tube 210 to the ear piece 204.

Further, as discussed above with respect to FIG. 1, hearing aid 102 is configurable to communicate with a remote device, such as computing device 125, through a communication channel. As mentioned above, hearing aid 102 can communicate with a computing device 125 to receive voice print information and associated sound-shaping instructions. Further, hearing aid 102 includes memory 104, which stores instructions, hearing aid profiles, and other information, which can be updated by signals received from computing device 125.

It should be understood that, while the embodiment 200 of hearing aid 102 illustrates an external "wrap-around" hearing device, the user-configurable processor 110 can be incorporated in other types of hearing aids, including other behind-the-ear hearing aid designs, as well as hearing aids designed to be worn within the ear canal or hearing aids designed for implantation. The embodiment 200 of hearing aid 102 depicted in FIG. 2 represents only one of many possible implementations with which the user-configurable processor may be used. While FIGS. 1 and 2 depict hearing aid 102 configured to shape audio signals according to hearing aid profiles and to selectively amplify or adjust selected portions of the audio signal based on sound-shaping instructions associated with a voice print, the hearing aid 102 may be configured to perform methods, such as the method described below with respect to FIG. 3.

Figure 3:
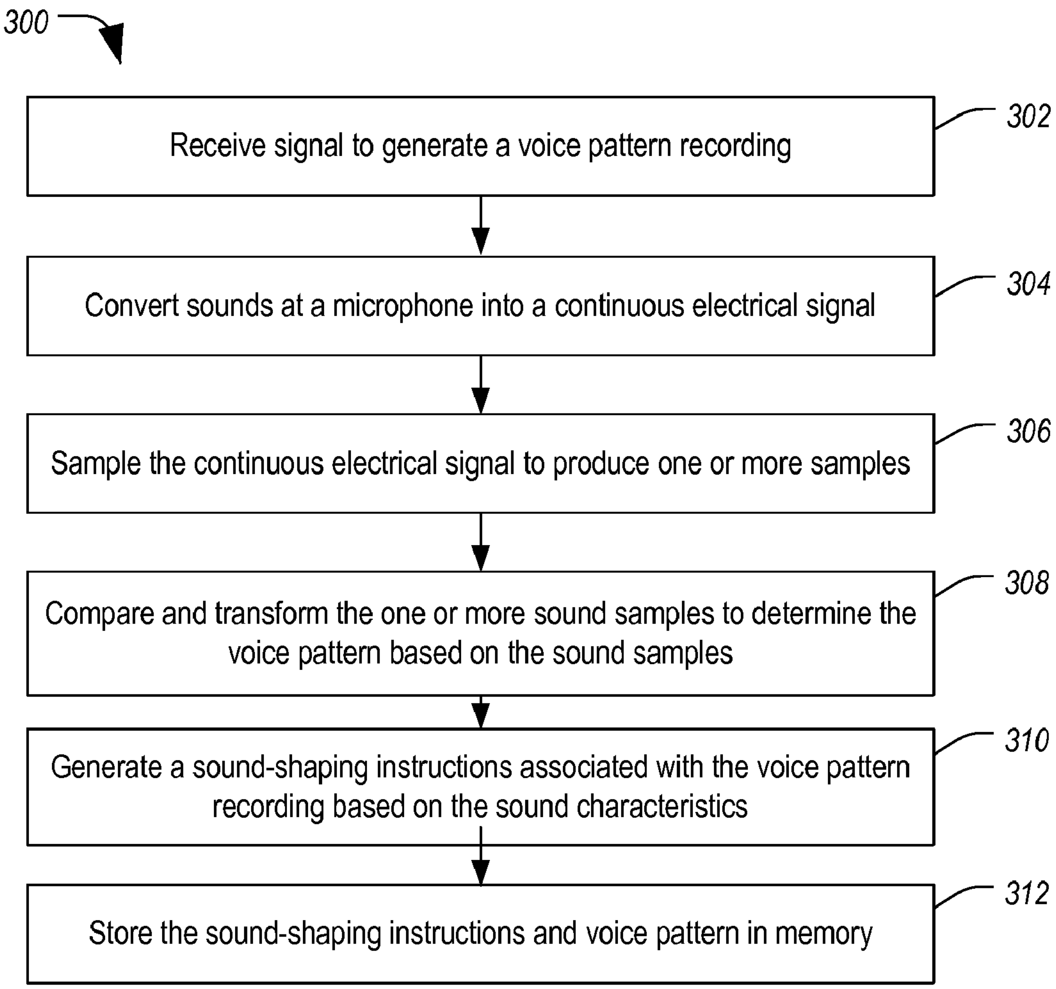
FIG. 3 is a flow diagram of an embodiment of a method for creating sound-shaping instructions for identifying and adjusting a particular voice print within audio signals.

FIG. 3 is a flow diagram of an embodiment of a method 300 for creating sound-shaping instructions for identifying and adjusting a particular voice print within audio signals. At 302, computing device 125 receives a signal from the user to generate a voice pattern recording. For example, computing device 125 may receive a user selection through user interface 139, which may be related to a GUI displayed on display interface 140. In response to receiving the user selection, processor 134 controls microphone 135 to record sound samples. In an alternative example, computing device 125 may receive an alert from hearing aid 102, which may produce the alert in response to receiving intermittent speech signals within a frequency range corresponding to a hearing impairment of the user. Proceeding to 304, processor 134 controls microphone 135 to convert sounds into a continuous electrical signal. Continuing to 306, an analog-to-digital converter (not shown) or the microphone produces one or more samples (sound samples) associated with the continuous electrical signal.

Advancing to 308, processor 134 compares and transforms the one or more sound samples to determine a voice print based on the sound samples. The voice print can be determined by applying a transform operation, such as a Fast Fourier Transform or a transformation operation that includes one or more algorithms, to the sound samples to produce a unique representation of the sound samples that can be used to detect speaker's voice in subsequent sound samples. In some instances, the unique representation may have some relation to other sound samples associated with other speakers. In other instances, the unique representation may be statistically unique over a large sample of speakers. Further, the results of the transform may be further refined by comparing the one or more sound samples to each other to determine the voice print. Additionally, the voice print may take into account one or more sound characteristics that can be used to uniquely identify a voice of a particular speaker within the continuous electrical signal.

Continuing to 310, processor 134 generates sound-shaping instructions associated with the voice print based on the sound characteristics. Processor 134 utilizes characteristics of the user's hearing deficiencies derived from the plurality of hearing aid profiles 127 to select one or more parameters for adjustment to enhance the user's ability to hear the content of the particular voice print. The sound-shaping instructions may include a frequency shift, frequency-specific gains, and other adjustment instructions for modifying a portion of the sound signals corresponding to the speaker's voice. For example, in some instances, the amplitude of the speaker's voice print may require adjustment, and the amplitude parameter is selected and configured for that voice print. In other instances, the frequencies associated with the voice print may correspond to frequencies at which the user has a hearing deficit, in which case the sound-shaping instructions may select a frequency parameter and configure the selected parameter to shift the frequencies associated with that voice print to another frequency range at which the user has better hearing capability. In other instances, a combination of parameters may be selected and configured to enhance the particular voice print to compensate for the user's hearing deficit. In a particular example, the sound-shaping instructions can include both adjustments to enhance the audio signals corresponding to the user's voice as well as filtering instructions for reducing other noise within the audio signals in order to enhance the speaker's voice within the sound environment. The sound shaping instructions can be used later by processor 110 of hearing aid 102 to shape sound signals received at microphone 120 particularly to emphasize or otherwise enhance the audio signal associated with the voice of the individual matching the voice print. The user may also edit the sound-shaping instructions at this time by interacting with the GUI on display interface 140 and by interacting with input interface 142 to make manual alterations and to apply additional sound-shaping instructions. Moving to 312, processor 134 stores the sound-shaping instructions and the voice print in memory 122.

As described above, once created, the sound-shaping instructions and voice print data can be used to adjust hearing aid 102 so that processor 110 of hearing aid 102 can shape audio signals to detect the speaker's voice within an audio signal and to shape the audio signal to enhance the speaker's voice.

While the embodiment of method 300 describes a particular linear flow, variations in method 300 can be made that perform the same or similar function. In other embodiments, some of the blocks may be performed by processor 110 and microphone 120 in hearing aid 102, such as recording the voice print. In a particular example, in response to the user selection, computing device 125 may communicate instructions and/or an alert (or trigger) to hearing aid 102, causing hearing aid 102 to capture audio samples and to provide the audio samples to computing device 125 for further processing (i.e., for determination of the voice print and for generation of the sound-shaping instructions). In other embodiments, computing device 125 and/or hearing aid 102 may perform other operations. For example, processor 134 may compare the one or more sound samples to voice prints stored in memory 122. If a voice print is detected that corresponds to the one or more sound samples, processor 134 retrieves the associated sound-shaping instructions and sends them to hearing aid 102 for application to the audio signals. However, if no corresponding voice print is found, processor 134 may retrieve the sound-shaping instructions associated with the voice print that represents a closest approximation to the sound samples. In this instance, computing device 125 can provide those sound-shaping instructions to hearing aid 102 and/or provide a GUI to allow the user to customize the sound-shaping instructions for the particular speaker.

In this latter example, computing device 125 may provide the sound-shaping instructions to hearing aid 102 and provide user-selectable options for adjusting the sound-shaping instructions. In response to receiving a user selection corresponding to one of the user-selectable options, computing device 125 can send an adjustment to hearing aid 102, which can apply the adjustment to refine the user's listening experience. The user may continue to interact with user interface 139 of computing device 125 to adjust the sound-shaping instructions until the hearing aid produces a desired audio output.

In the discussion of the method of FIG. 3, hearing aid 102, by itself or in conjunction with computing device 125, generates a voice print and sound-shaping instructions that may be utilized to emphasize a speaker's voice. One example of a method that the hearing aid system can utilize to shape sound at hearing aid 102 using the voice print is discussed below with respect to FIG. 4.

Figure 4:
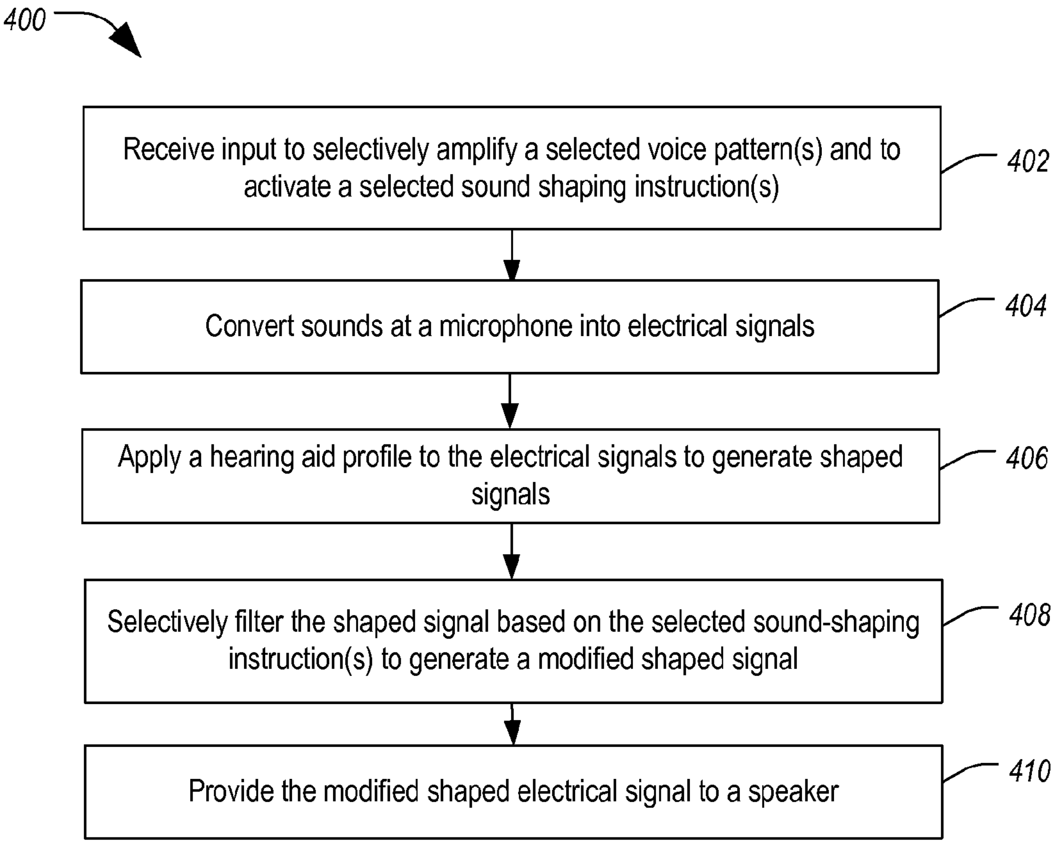
FIG. 4 is a flow diagram an embodiment of a method of selectively filtering audio signals to provide emphasis to a particular voice print within the audio signals.

FIG. 4 is a flow diagram an embodiment of a method 400 of selectively filtering audio signals to provide emphasis to a particular voice print within the audio signals. At 402, processor 110 receives an input to selectively amplify a selected voice print or patterns and to activate the selected sound-shaping instructions associated with the selected voice print(s). The signal can be received directly from the user at hearing aid 102 either through a spoken command or through a command triggered by the user through user interface 139 on computing device 125.

In an embodiment, hearing aid 102 may include speech recognition instructions that are configured to recognize particular spoken commands and to execute instructions in response to detecting the spoken commands. In another embodiment, the user will select the voice print using display interface 140 and input interface 142 in response to a user-selectable option presented in a GUI on display interface 140. In still another embodiment, microphone 135 will provide a sound signal to processor 134, which is configured to detect the voice print by comparing the sound signal to the set of sound characteristics associated with the voice prints. If computing device 125 detects a particular voice print, it can signal hearing aid 102 automatically to apply a particular voice print to electrical signals representing sounds that are received from microphone 120.

Proceeding to 404, microphone 120 converts sounds to electrical signals. The sounds may include a speaker's voice as well as other sounds, such as music, other speakers' voices, etc. Advancing to 406, processor 110 applies a hearing aid profile from the plurality of hearing aid profiles 103 to the continuous electrical signal to generate a shaped signal. The shaped signal is compensated for the user's hearing deficiency.

Moving to 408, processor 110 selectively filters the shaped signal based on the selected sound-shaping instructions to generate a modified shaped signal. The modified shaped signal is modulated to adjust the portion of the shaped signal associated with the voice print to emphasize or otherwise enhance the voice print. In one example, the selected sound-shaping instructions provide an emphasis to a particular frequency set, band, or range associated with the voice print, such that the second shaped signal includes the enhanced voice print. Processor 110 may be adapted to apply multiple sound shaping instructions to the electrical signal providing a shaped audio signal to include emphasis for multiple speakers.

In an alternative embodiment, 406 and 408 may be reversed such that processor 110 first applies the sound-shaping instructions to adjust a portion of the electrical signal to generate a first shaped output, providing emphasis to the frequency set, band, or range associated with the voice print. In this example, processor 110 then applies the selected hearing aid profile to the first shaped output to generate a second shaped output further providing correction for the hearing aid user's hearing loss. In another alternative embodiment, the sound-shaping instructions and the hearing aid profile could be applied independently and the results merged. For example, the continuous electrical signal may be passed through an adaptive band pass filter to remove the frequency set, band, or range associated with the voice print from the general electrical signal. Processor 110 then applies the sound shaping instructions to the signals that passed through the band pass filter. In this instance, the continuous electrical signal may be processed to extract the frequency set, band or range associated with the voice print and to apply the associated sound-shaping instructions to modulate that frequency set, band or range. Processor 110 combines the resulting signals to produce an output signal that is provided to the speaker of the hearing aid 102.

Once the sound is fully shaped method 400 advances to 410 and provides the shaped sound signal to speaker 114 for reproduction for the user. Processor 110 can continue to shape the sound signal using the voice print sound-shaping instructions until the user interacts with computing device 125 to change the settings on the hearing aid, to indicate a new voice print, or to return hearing aid 102 to a base level. In an alternative example, processor 110 may detect a new speaker and automatically update hearing aid 102 with additional sound-shaping instructions for use to enhance the speaker's voice within the audio signal.

In conjunction with the system, hearing aid, and methods described above with respect to FIGS. 1-4, a hearing aid includes a processor configured to apply a hearing aid profile and optionally one or more sound-shaping instructions to audio signals to shape the audio signal to compensate for the user's hearing impairment and to enhance audio content associated with a particular person (speaker). In a particular example, hearing aid 102 compares audio samples to a voice print to identify a particular speaker, selects associated sound-shaping instructions, and adjusts a portion of the audio signal according to the sound-shaping instructions to enhance the user's ability to hear the particular speaker.

Further, in conjunction with the system, hearing aid, and methods described above with respect to FIGS. 1-4, a computing device is configurable to communicate with the hearing aid through a communication channel (wired or wireless). The computing device is configured to receive audio samples, generate a voice print from the audio samples that can be used to detect the speaker's voice within an audio signal, and generate sound-shaping instructions based on the user's hearing impairment that can be applied to audio signals by a processor of the hearing aid to selectively enhance the speaker's voice within an audio signal.

Although the present invention has been described with reference to preferred embodiments, workers skilled in the art will recognize that changes may be made in form and detail without departing from the scope of the invention.

What is claimed is:

1. A hearing aid comprising:

a microphone to convert sounds into electrical signals;

a memory to store a plurality of voice prints and a plurality of sound-shaping instructions, each of the plurality of sound-shaping instructions associated with one of the plurality of voice prints;

a processor coupled to the microphone and the memory, the processor configured to compare at least one sample from the electrical signals to the plurality of voice prints to identify a voice print, the processor to select a first set of sound-shaping instructions associated with the voice print and to apply the first set of sound-shaping instructions to selectively shape a first portion of the electrical signals and to apply a second set of sound-shaping instructions to a second portion of the electrical signals, the first portion corresponding to the electrical signals associated with the voice print and the second portion associated with the reminder of the electrical signals, the second set of sound-shaping instructions being different than the first set of sound-shaping instructions; and a speaker coupled to the processor and configured to reproduce the shaped signal as an audible output.

2. The hearing aid of claim 1, wherein each of the plurality of voice prints comprises a biometric identifier representative of an individual's voice.

3. The hearing aid of claim 1, wherein the second set of sound-shaping instructions is based on at least one hearing aid profile.

4. The hearing aid of claim 1, wherein the processor is configured to identify a second voice print within the electrical signals and to select and apply a third set of sound-shaping instructions associated with the second voice print to a third portion of the electrical signals, the third portion corresponding to the electrical signals associated with the second voice print.

5. The hearing aid of claim 4, wherein:

the first portion comprises a first frequency range;

the second portion comprises a second frequency range; and the third portion comprises a third frequency range.

6. The hearing aid of claim 1, further comprising a transceiver adapted to communicate with a computing device through a communication channel.

7. The hearing aid of claim 6, wherein the hearing aid receives the sound shaping instructions from the computing device.

8. The hearing aid of claim 6, wherein the computing device comprises a smart phone.

9. A computing device comprising:

a memory for storing a plurality of voice prints and a plurality of sets of sound-shaping instructions, each set of the plurality of sets of sound-shaping instructions is associated with a respective one of the plurality of voice prints;

a transceiver for communicating with a hearing aid through a communication channel;

a processor coupled to the memory and the transceiver, the processor configured to receive a sound sample, to identify a voice print associated with the sound sample, determine a first portion of the sound sample associated with the voice print, and to selectively provide a first set of sound-shaping instructions associated with the voice print from the plurality of sets of sound-shaping instructions for shaping the first portion and a second set of sound-shaping instructions from the plurality of sets of sound-shaping instructions for shaping the remaining portion of the sound sample to the hearing aid in response to receiving the sound sample; and wherein the first set of sound shaping instructions is different than the second et of sound-shaping instructions.

10. The computing device of claim 9, wherein the sound sample is received from the hearing aid through the communication channel.

11. The computing device of claim 9, further comprising:

a microphone coupled to the processor to convert sounds into electrical signals; and wherein the processor is configured to receive the sound sample corresponding to the electrical signals from the microphone and to process the sound sample to identify the voice print from the plurality of voice prints.

12. The computing device of claim 11, wherein the processor controls the microphone to convert the sounds into the electrical signals.

13. The computing device of claim 12, further comprising a user interface coupled to the processor for receiving user input;

wherein the processor controls the microphone in response to receiving the user input.

14. The computing device of claim 9, wherein the processor is configured to identify a second voice print within the sound sample, and to selectively provide a third set of sound-shaping instructions to the hearing aid in response to identifying the second voice print.

15. The computing device of claim 9, wherein the processor is configured to generate the voice print from one or more sound samples and to generate an associated set of sound-shaping instructions based on a hearing profile configured to compensate for a hearing deficiency of the user, the associated set of sound-shaping instructions is executable by the processor to shape at least a portion of the electrical signals corresponding to the voice print.

16. A method comprising:

identifying one or more voice prints within an electrical signal related to a sound;

selectively applying a first set of sound shaping instructions to the electrical signal to shape a first portion of the electrical signal corresponding to the electrical signals associated with the voice print and a second set of sound shaping instructions to the remaining portion to produce a shaped output signal, the second set of sound shaping instructions being different than the first set of sound shaping instructions; and producing an audible output signal at a speaker of a hearing aid based on the shaped output signal.

17. The method of claim 16, further comprising applying a hearing aid profile to the shaped output signal to compensate for a hearing impairment of a user before producing the audible output signal.

18. The method of claim 16, wherein identifying the one or more voice patterns within the electrical signal and selectively applying the one or more sets of sound shaping instructions to the electrical signal are performed by a computing device, the method further comprising:

transmitting the shaped output signal from the computing device to the hearing aid through a communication channel.

19. The method of claim 16, further comprising:

providing one or more selection options to a user via a user interface, wherein each of the one or more selection options is associated with at least one set of the one or more sets of sound shaping instructions associated with the one or more voice prints; and receiving a selection corresponding to a selected one of the one or more selection options as the first set of sound shaping instructions.

20. The method of claim 16, wherein identifying the one or more voice patterns within the electrical signal and selectively applying the sets of sound shaping instructions to the electrical signal are performed by a hearing aid.

* * * * *